(12) United States Patent
Lee

(10) Patent No.: US 9,085,417 B2
(45) Date of Patent: Jul. 21, 2015

(54) MEDIA TRANSFERRING APPARATUS AND FINANCE DEVICE

(71) Applicant: LG CNS CO., LTD., Seoul (KR)

(72) Inventor: Seung Jong Lee, Seoul (KR)

(73) Assignee: LG CNS Co., Ltd., Seoul (KR)

( * ) Notice: Subject to any disclaimer, the term of this patent is extended or adjusted under 35 U.S.C. 154(b) by 88 days.

(21) Appl. No.: 13/894,510

(22) Filed: May 15, 2013

(65) Prior Publication Data

US 2013/0306436 A1    Nov. 21, 2013

(30) Foreign Application Priority Data

May 15, 2012    (KR) ........................ 10-2012-0051341

(51) Int. Cl.
*B65G 37/00*    (2006.01)
*G07F 19/00*    (2006.01)
*G07D 11/00*    (2006.01)

(52) U.S. Cl.
CPC .......... B65G 37/005 (2013.01); G07D 11/0003 (2013.01); G07F 19/202 (2013.01)

(58) Field of Classification Search
USPC .............. 198/604, 608, 611, 620, 624, 626.1; 271/188, 198, 34
See application file for complete search history.

(56) References Cited

U.S. PATENT DOCUMENTS

| | | | | |
|---|---|---|---|---|
| 4,025,068 A | * | 5/1977 | Collins | 271/34 |
| 4,232,691 A | * | 11/1980 | Grant | 198/626.1 |
| 4,922,304 A | * | 5/1990 | Gilbert et al. | 198/620 |
| 5,555,083 A | * | 9/1996 | Kuo et al. | 271/188 |
| 5,657,980 A | * | 8/1997 | Cargill et al. | 271/3.05 |
| 6,267,225 B1 | | 7/2001 | Compera et al. | |
| 6,341,698 B1 | * | 1/2002 | Wursthorn | 209/552 |
| 6,619,657 B2 | * | 9/2003 | Horikoshi et al. | 271/188 |
| 8,439,184 B2 | * | 5/2013 | Jorgensen | 198/626.1 |
| 8,608,165 B2 | * | 12/2013 | Nakagaki | 271/186 |

FOREIGN PATENT DOCUMENTS

| | | |
|---|---|---|
| CN | 1202867 A | 12/1998 |
| CN | 201213918 Y | 4/2009 |
| JP | 2004-175526 A | 6/2004 |
| KR | 20-1999-0041770 U | 12/1999 |
| KR | 10-2004-0047447 A | 6/2004 |
| KR | 10-2008-0000742 A | 1/2008 |

OTHER PUBLICATIONS

Office Action dated Aug. 1, 2013 in Korean Application No. Oct. 2012-0051341, filed May 15, 2012.
Office Action dated Dec. 23, 2014 in Chinese Application No. 2013101778538, filed May 15, 2012.

* cited by examiner

*Primary Examiner* — James R Bidwell
(74) *Attorney, Agent, or Firm* — Saliwanchik, Lloyd & Eisenschenk

(57) ABSTRACT

Provided are a medium transferring apparatus and a financial device. The medium transferring apparatus comprises one or more driving rollers disposed on a side of a medium transferring path, a belt wound around the one or more driving rollers and operated by rotation of the one or more driving rollers, and one or more support rollers contacting one surface of the belt. A medium passes between the one surface of the belt and the one or more support rollers.

19 Claims, 4 Drawing Sheets

MEDIA TRANSFERRING APPARATUS AND FINANCE DEVICE

CROSS-REFERENCE TO RELATED APPLICATION

This application claims the benefit under 35 U.S.C. §119 of Korean Patent Application No. 10-2012-0051341, filed May 15, 2012, which is hereby incorporated by reference in its entirety.

BACKGROUND

The present disclosure relates to a medium transferring apparatus and a financial device.

In general, financial devices are devices for automatically processing financial business desired by customers. The financial devices may deposit or withdraw media (for example, paper moneys, checks, securities, gift certificates, and the like) or automatically transfer the media.

Such a financial device comprises a medium handling device for deposing or withdrawing a medium, a medium storage part, and a medium handling part. The medium may be deposited through the medium handling device and then stored in the medium storage part, and the medium stored in the medium storage part may be withdrawn through the medium handling device.

The medium deposited through the medium handling device is transferred along a medium transferring path. A medium transferring apparatus is provided in the medium transferring path to transfer the medium.

The medium transferring apparatus may comprise a plurality of rollers or a plurality of rollers and a belt.

The plurality of rollers may be disposed along the medium transferring path. The plurality of rollers comprises a driving roller receiving power and a pressure roller contacting the driving roller. The driving roller and the pressure roller may be called a transferring module. The transferring module may be provided in plurality in the medium transferring path. Here, a distance between the transferring modules may be less than a length of the medium to be transferred. When power is provided to the driving roller to allow the transferring module to rotate, the medium is transferred by passing between the driving roller and the pressure roller. In this case, since the power should be transmitted into all of the plurality of driving rollers, it may be inefficient in design in that a power transmission structure for transmitting the power into each of the driving rollers is required.

In the medium transferring apparatus using the plurality of roller and the belt, the belt is wound around an outer surface of each of the rollers. The belt is configured to allow the medium contacting the belt to be carried along the medium transferring path by friction force between the belt and the medium. The plurality of rollers comprises the driving roller receiving the power. When the driving roller receives the power to rotate, the belt wound around the plurality of rollers moves along the medium transferring path. In this case, even though the power is transmitted into only one roller, the power may be transmitted into the other rollers by friction force and tension of the belt. However, when the medium transferring apparatus is designed so as to maintain the tension and friction force of the belt, a transferring path of the medium may be longer.

BRIEF SUMMARY

Embodiments provide a medium transferring apparatus and a financial device.

In one embodiment, a medium transferring apparatus comprises: one or more driving rollers disposed on a side of a medium transferring path; a belt wound around the one or more driving rollers and operated by rotation of the at least one driving roller; and one or more support rollers contacting one surface of the belt, wherein a medium passes between the one surface of the belt and the one or more support rollers.

In another embodiment, a financial device comprises: a medium handling part through which a medium is deposited or withdrawn; a medium storage part in which the medium is stored; and a medium transferring apparatus transferring the medium, wherein the medium transferring apparatus comprises: one or more driving rollers; a belt wound around the one or more driving rollers and operated by rotation of the one or more driving rollers; and one or more support rollers contacting one surface of the belt, wherein a medium passes between the one surface of the belt and the one or more support rollers.

The details of one or more embodiments are set forth in the accompanying drawings and the description below. Other features will be apparent from the description and drawings, and from the claims.

DETAILED DESCRIPTION

Figure 1:
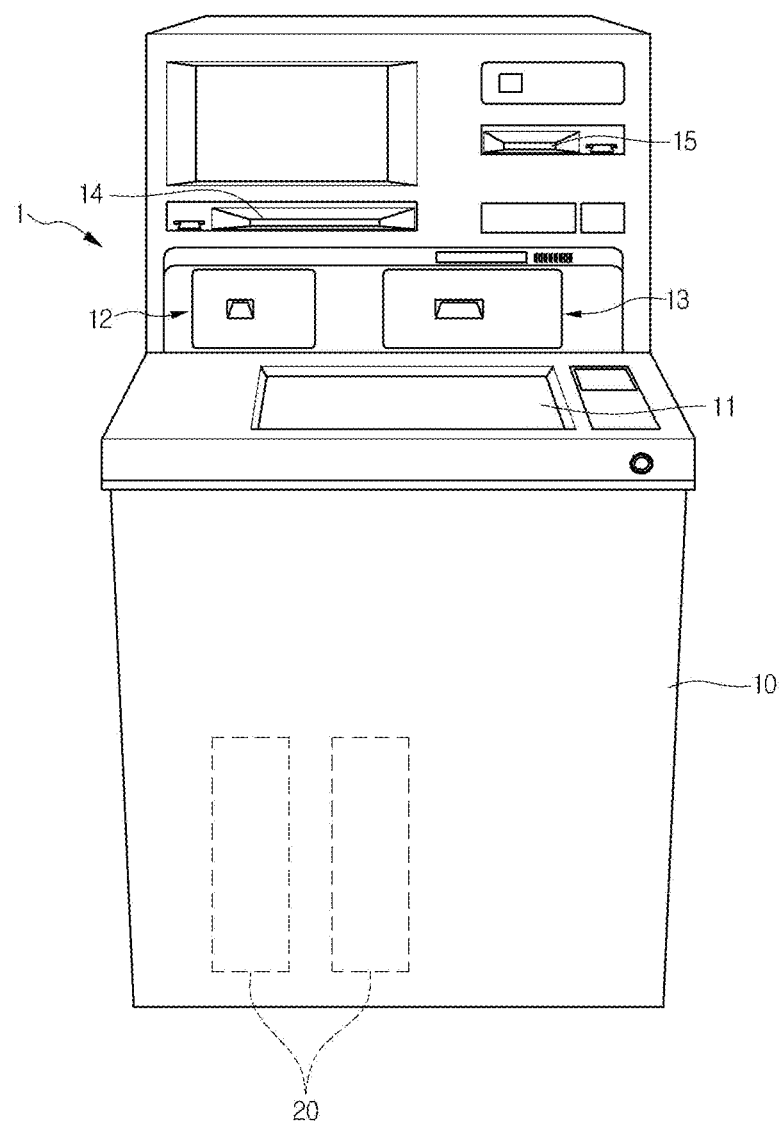
FIG. 1 is a perspective view of a financial device according to an embodiment.

Hereinafter, exemplary embodiments of the present disclosure will be described with reference to the accompanying drawings. Regarding the reference numerals assigned to the elements in the drawings, it should be noted that the same elements will be designated by the same reference numerals, wherever possible, even though they are shown in different drawings. Also, in the description of embodiments, detailed description of well-known related structures or functions will be omitted when it is deemed that such description will cause ambiguous interpretation of the present disclosure.

Also, in the description of embodiments, terms such as first, second, A, B, (a), (b) or the like may be used herein when describing components of the present invention. Each of these terminologies is not used to define an essence, order or sequence of a corresponding component but used merely to distinguish the corresponding component from other component(s). It should be noted that if it is described in the specification that one component is "connected," "coupled" or "joined" to another component, the former may be directly "connected," "coupled," and "joined" to the latter or "connected", "coupled", and "joined" to the latter via another component.

A financial device according to embodiments is a device that performs financial businesses, i.e., medium processing comprising processing such as deposit processing, giro receipt, or gift certificate exchange and/or processing such as withdrawal processing, giro dispensing, or gift certificate dispensing by receiving various media such as, e.g., paper moneys, bills, giros, coins, gift certificates, etc. For example, the financial device may comprise an automatic teller machine (ATM) such as a cash dispenser (CD) or a cash recycling device. However, the financial device is not limited to the above-described examples. For example, the financial device may be a device for automatically performing the financial businesses such as a financial information system (FIS).

Hereinafter, assuming that the financial device is the ATM, an embodiment will be described. However, this assumption is merely for convenience of description, and technical idea of the present disclosure is not limited to the ATM.

FIG. 1 is a perspective view of a financial device according to an embodiment.

Referring to FIG. 1, a financial device 1 according to an embodiment comprises a main body 10 in which a plurality of components are accommodated. The main body 10 may comprise an input part 11 for allowing a user to process financial business, a check handling part 12 for depositing or withdrawing a check, a medium handling part 13 for deposing or withdrawing a medium, a bankbook handling part 14 for depositing or withdrawing, and a card handling part 15 for depositing or withdrawing an integrated circuit (IC) card for a financial process. Also, the main body 10 may comprise a medium storage module 20. The medium deposited through the medium handling part 13 may be stored in the medium storage module 20.

According to a kind of financial device, at least one of the check handling part 12, the bankbook handling part 14, and the card handling part 15 may be omitted.

Figure 2:
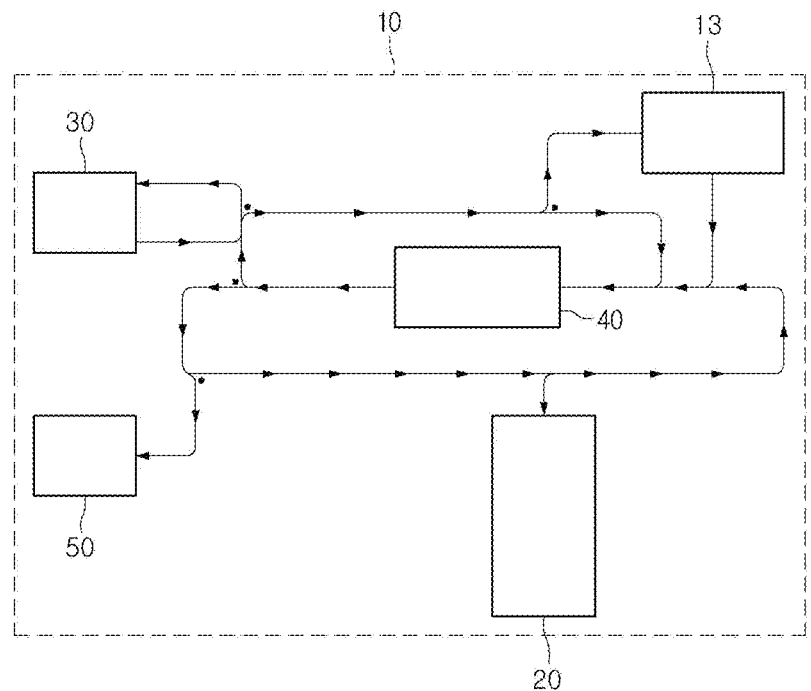
FIG. 2 is a schematic view of the financial device according to an embodiment.

FIG. 2 is a schematic view of the financial device according to an embodiment.

Referring to FIG. 2, the main body 10 may comprise the medium handling part 13, a medium cassette 20, a temporary stacker 30, a discrimination part 40, and a collection part 50.

The medium handling part 13 has a medium accommodation space that is accessible by a customer. The medium accommodation space communicates with the outside by a shutter. The medium handling part 13 may comprise a pick-up unit for separating media one by one from the medium accommodation space when a customer deposits the media and an integration unit for integrating carried media together when a customer withdraws the media.

The discrimination part 40 comprises a detection unit for distinguishing a kind of media or determining and separating faulty media when media are deposited or withdrawn. The discrimination part 40 may detect a size, color, and image of a medium to distinguish a kind of medium or determine a faulty medium.

The temporary stacker 30 provides a space for temporarily stacking media deposited through the medium handling part 13 when the customer deposits the media in the financial device. The media stacked in the temporary stacker 30 are carried into the medium cassette 20 when the customer finally decides the deposition of the media.

At least one medium cassette 20 may be provided in the main body 10. The medium cassette 20 accommodates normal media which are not classified into the faulty medium by the discrimination part 40 and stores media to be withdrawn when a medium withdrawal command is inputted. For this, the medium cassette 20 comprises a medium inlet configured to accommodate carried paper moneys into the medium cassette 20 and a medium outlet configured to withdraw media integrated within the medium cassette 20 to the outside. In general, the medium inlet and the medium outlet may be disposed in an upper end of a box defining an outer appearance of the medium cassette 20.

The medium determined as the faulty medium by the discrimination part 40 and medium that is not received for a predetermined time after being withdrawn into the medium handling part 13 are integrated into the recovery part 50. The recovery part 50 may comprise a medium inlet configured to take a medium therein. Also, a medium integration unit for evenly integrating media may be provided in the recovery part 50.

The medium stacking unit for evenly stacking media carried from the outside and the medium pick-up unit for separating the stacked media one by one to carry the separated media to the outside may be provided together within the medium cassette 20. Since the above-described structure is previously known, detailed descriptions thereof will be omitted.

The movement of a medium within the main body 10 may be performed by the medium transferring apparatus provided in the medium transferring path. Hereinafter, the medium transferring apparatus will be described with reference to the accompanying drawings.

Figure 3:
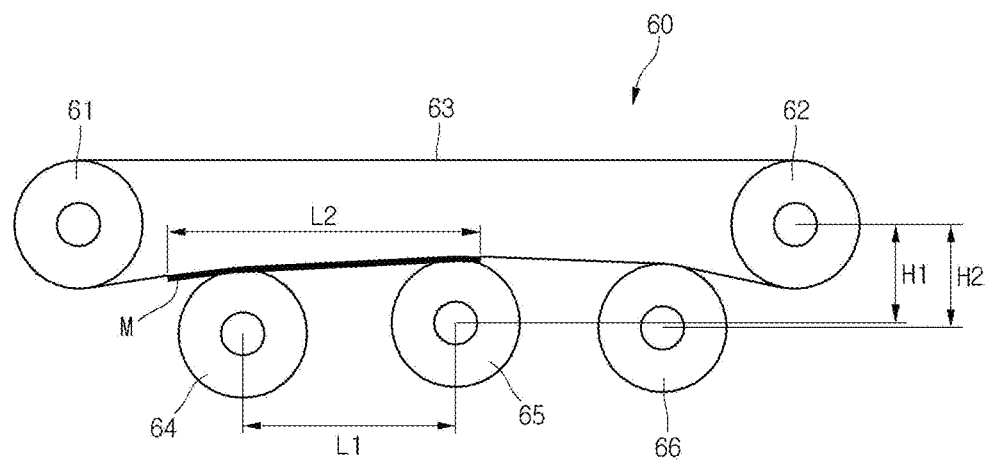
FIG. 3 is a side view of a medium transferring apparatus according to an embodiment.
Figure 4:
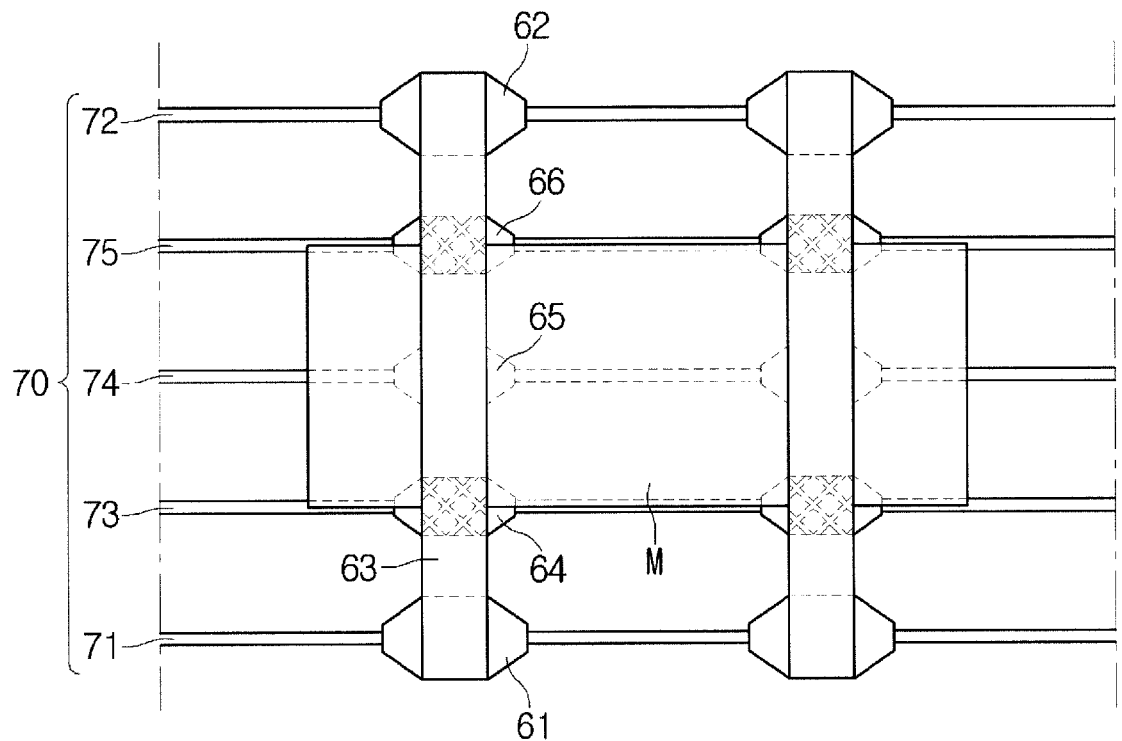
FIG. 4 is a view of the medium transferring apparatus according to an embodiment.

FIG. 3 is a side view of the medium transferring apparatus according to an embodiment, and FIG. 4 is a view of the medium transferring apparatus according to an embodiment.

Referring to FIGS. 3 and 4, a medium transferring apparatus 60 according to an embodiment comprises a plurality of rollers 61, 62, 64, 65 and 66 and a belt 63. The medium transferring apparatus 60 may be provided in one side of a medium transferring path through which a medium M moves.

The rollers comprise a first roller 61 and a second roller 62 around which the belt 63 is wound. Since power is transmitted from a power transmission device (not shown) into at least one of the first and second rollers 61 and 62 to operate the belt 63, the first and second rollers 61 and 62 may be called driving rollers.

The first and second rollers 61 and 62 may be spaced a predetermined distance from each other within the medium transferring path through which the medium M is carried. Also, the belt 63 may have both ends respectively wound around the first and second rollers 61 and 62. The belt 63 may be manufactured using a material having tension. The belt 63 may be wound around the first and second rollers 61 and 62 so that the belt 63 is strainedly pulled.

According to the current embodiment, a first driving shaft 71 may be connected to the first roller 61, and a second driving shaft 72 may be connected to the second roller 62. Power applied from a power source may be transmitted into the first and second driving shafts 71 and 72. Thus, the first and second driving shafts 71 and 72 may operate to rotate the first and second rollers 61 and 62. Here, the first and second rollers 61 and 62 may rotate at the same speed. As the first and second rollers 61 and 62 rotate, the belt 63 may also rotate.

According to another embodiment, the first driving shaft 71 may be connected to the first roller 61, and also, power may be applied into only the first driving shaft 71. As the first roller 61 rotates by the first driving shaft 71, the belt 63 may rotate also, and then the second roller 62 may rotate also by the belt 63.

At least one support roller supporting the belt 63 may be provided under the belt 63. For example, a third roller 64 (or a first support roller), a fourth roller 65 (or a second support roller), and a fifth roller 66 (or a third support roller) may be provided under the belt 63. However, the present disclosure is not limited to the number of support rollers. For example, one support roller may be provided. Hereinafter, the support roller comprising the third roller 64, the fourth roller 65, and the fifth roller 66 will be described as an example.

The third roller 64, the fourth roller 65, and the fifth roller 66 may be spaced a predetermined distance from each other in a direction parallel to a medium transferring direction to contact the belt 63. The fourth roller 65 may be disposed between the third roller 64 and the fifth roller 66.

The third roller 64, the fourth roller 65, and the fifth roller 66 may press the belt 63. According to the current embodiment, the third roller 64, the fourth roller 65, and the fifth roller 66 may press the belt 63 upward from a lower side. The third roller 64, the fourth roller 65, and the fifth roller 66 may contact a bottom surface of the belt 63.

Here, the fourth roller 65 may be disposed above the third roller 64 and the fifth roller 66. The fourth roller 65 may press the belt 63 with force greater than that pressed by the third and fifth rollers 64 and 66. As shown in FIG. 3, the support rollers may be disposed so that a distance H1 from a rotation shaft of the first or second roller 61 or 62 to a rotation shaft of the fourth roller 65 is less than that H2 from the rotation shaft of the first or second roller 61 or 62 to a rotation shaft of the third or fifth roller 64 or 66. That is, a distance between a rotation shaft of one portion of the at least one support roller and the rotation shaft of the driving roller may be less than that between a rotation shaft of the other portion of the at least one support roller and the rotation shaft of the driving roller. Thus, the belt 63 contacting the support rollers may have an arch shape. The medium M passes between a bottom surface of the arch-shaped belt 63 and the support rollers.

For another example, only the fourth roller 64 may press the belt 63. Thus, the third and fifth rollers 64 and 66 may simply contact the belt 63.

For another example, the distance H1 from the rotation shaft of the first or second roller 61 or 62 to the rotation shaft of the fourth roller 65 may be equal to that H2 from the rotation shaft of the first or second roller 61 or 62 to the rotation shaft of the third or fifth roller 64 or 66. However, the fourth roller 65 may have a diameter greater than that of the third or fifth roller 64 or 66.

The medium M passes between the bottom surface of the belt 63 and the third, fourth, and fifth rollers 64, 65, and 66. The third roller 64 and the fourth roller 64 may be disposed so that a distance L1 between the third roller 64 and the fourth roller 65 is less than a length L2 of the medium M. Similarly, the fourth roller 65 and the fifth roller 66 may be disposed so that a distance between the fourth roller 65 and the fifth roller 66 is less than the length L2 of the medium M.

The third, fourth, and the fifth rollers 64, 65, and 66 may rotate by friction force against the belt 63 without applying power. Also, to providing more high transferring force to the medium M, power may be applied to the support rollers. Here, the support rollers may be controlled so that the support rollers rotate at the same linear velocity as the belt 63. Thus, it may inhibit the belt 63 from being taken off the support rollers.

An outer surface of each of the rollers contacting the medium M to carry the medium M may be formed of a rubber material. The third, fourth, and fifth rollers 64, 65, and 66 may be rubber rollers formed of rubber. A predetermined pattern may be disposed on an outer surface of the at least one support roller to increase the friction force with the belt 63 or the medium M, thereby effectively transferring the medium M.

The outer surface of each of the third, fourth, and fifth rollers 64, 65, and 66 contacting the belt 63 may be manufactured with the same material as the belt 63. For example, a surface of each of the third, fourth, and fifth rollers 64, 65, and 66 contacting the belt 63 may be manufactured with a rubber material equal to that of the belt 63. Thus, it may inhibit the belt 63 from being worn by the third, fourth, and fifth rollers 64, 65, and 66.

A central portion of the outer surface of the at least one support roller 64, 65, or 66 may protrude when compared to both edges thereof. Thus, it may inhibit the belt 63 from being taken off the support rollers. That is, each of the support rollers 64, 65, and 66 may have a central diameter greater than that of each of both sides thereof.

The present disclosure is not limited to the number and position of driving roller.

As described above, in the medium transferring apparatus, the power transmission device may not be complicated in structure and not occupy a large space to reduce manufacturing costs.

Figure 5:
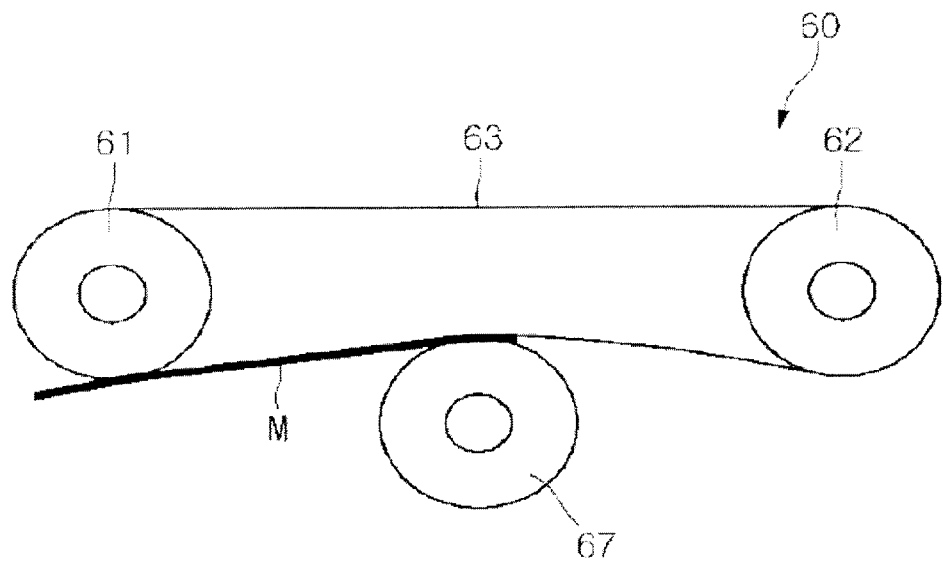
FIG. 5 is a side view of a medium transferring apparatus according to another embodiment.
Figure 6:
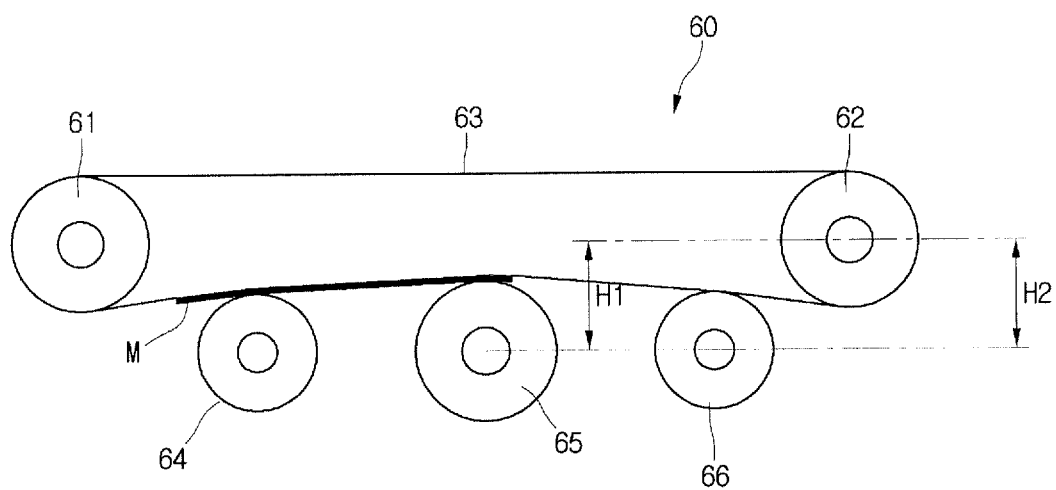
FIG. 6 is a side view of a medium transferring apparatus according to another embodiment.

FIG. 5 is a side view of a medium transferring apparatus according to another embodiment.

Referring to FIG. 5, a medium transferring apparatus according to the current embodiment may comprise at least one driving roller 61 or 62 around which a belt 62 is wound and one support roller 67 contacting the belt 63 to press the belt 63. The support roller 67 according to the current embodiment may correspond to the second support roller 65 of FIG. 3. Since the current embodiment is equal to the foregoing embodiment except for the number of support roller, descriptions with respect to the medium transferring apparatus according to the current embodiment will be derived from those of the forgoing embodiment.

Even though all the elements of the embodiments are coupled into one or operated in the combined state, the present disclosure is not limited to such an embodiment. That is, all the elements may be selectively combined with each other without departing the scope of the invention. Furthermore, when it is described that one comprises (or comprises or has) some elements, it should be understood that it may comprise (or comprise or has) only those elements, or it may comprise (or comprise or have) other elements as well as those elements if there is no specific limitation. Unless otherwise specifically defined herein, all terms comprising technical or scientific terms are to be given meanings understood by those skilled in the art. Like terms defined in dictionaries, generally used terms needs to be construed as meaning used in technical contexts and are not construed as ideal or excessively formal meanings unless otherwise clearly defined herein.

Although embodiments have been described with reference to a number of illustrative embodiments thereof, it will be understood by those skilled in the art that various changes in form and details may be made therein without departing from the spirit and scope of the invention as defined by the appended claims. Therefore, the preferred embodiments should be considered in descriptive sense only and not for purposes of limitation, and also the technical scope of the invention is not limited to the embodiments. Furthermore, is defined not by the detailed description of the invention but by the appended claims, and all differences within the scope will be construed as being comprised in the present disclosure.

What is claimed is:

1. A medium transferring apparatus comprising:
   one or more driving rollers disposed on a side of a medium transferring path;
   a belt wound around the one or more driving rollers and operated by a rotation of the one or more driving rollers; and
   one or more support rollers contacting one surface of the belt, wherein a medium passes between the one surface of the belt and the one or more support rollers, and wherein the one or more support rollers include a central portion having a diameter greater than that of each of both edges thereof.

2. The medium transferring apparatus of claim 1, wherein the one or more support rollers press the one surface of the belt so that a portion of the belt contacting the one or more support rollers have an arch shape.

3. The medium transferring apparatus of claim 1, wherein, when power is transmitted into the one or more driving rollers, the one or more support rollers rotate at the same linear velocity as that of the belt by friction force against the belt.

4. The medium transferring apparatus of claim 1, wherein the one or more support rollers are provided in plurality, and
 a distance between the plurality of support rollers is less than a length of the medium.

5. The medium transferring apparatus of claim 1, wherein an outer surface of the one or more support rollers is manufactured with the same material as that of the belt.

6. The medium transferring apparatus of claim 5, wherein a predetermined pattern is disposed on the outer surface of the one or more support rollers.

7. A financial device comprising:
 a medium handling part through which a medium is deposited or withdrawn;
 a medium storage part in which the medium is stored; and
 a medium transferring apparatus transferring the medium,
 wherein the medium transferring apparatus comprises:
 one or more driving rollers;
 a belt wound around the one or more driving rollers and operated by a rotation of the one or more driving rollers; and
 one or more support rollers contacting one surface of the belt,
 wherein a medium passes between the one surface of the belt and the one or more support rollers, and
 wherein the one or more support rollers include a central portion having a diameter greater than that of each of both edges thereof.

8. The medium transferring apparatus of claim 1, wherein the one or more support rollers are provided in plurality, and
 the plurality of support rollers are spaced apart from each other in a direction parallel to a transferring direction of the medium.

9. The medium transferring apparatus of claim 8, wherein a distance between a driving shaft of the one or more driving rollers and a rotation shaft of one of the plurality of support rollers is different from that between the driving shaft of the one or more driving rollers and a rotation shaft of the other of the plurality of support rollers.

10. The medium transferring apparatus of claim 8, wherein the plurality of support rollers comprise a first support roller, a third support roller spaced apart from the first support roller, and a second support roller disposed between the first support roller and the third support roller, and
 a vertical distance between a rotation shaft of the second support roller and a driving shaft of the one or more driving rollers is less than that between a rotation shaft of the first or third support roller and the driving shaft of the one or more driving rollers.

11. The medium transferring apparatus of claim 8, wherein one of plurality of support rollers has a diameter less than that of the other of plurality of support rollers.

12. The financial device of claim 7, wherein the one or more support rollers are rotated by a friction force against the belt without applying a power.

13. The financial device of claim 7, wherein a vertical distance between a driving shaft of the one or more driving rollers and a rotation shaft of one of the support rollers is different from that between the driving shaft of the one or more driving rollers and a rotation shaft of the other of the support rollers.

14. The financial device of claim 13, wherein the one of support rollers and the other of support rollers have the same diameter.

15. The financial device of claim 13, wherein pressing force pressed onto one surface of the belt by the one of support rollers is greater than that pressed onto the one surface of the belt by the other of support rollers.

16. The financial device of claim 7, wherein one of support rollers and the other of support rollers have diameters different from each other.

17. The financial device of claim 16, wherein vertical distances between a driving shaft of the one or more driving roller and the support rollers are the same.

18. The financial device of claim 7, wherein the one or more support rollers comprise a first support roller, a third support roller spaced apart from the first support roller, and a second support roller disposed between the first support roller and the third support roller, and
 a vertical distance between a rotation shaft of the second support roller and a driving shaft of the one or more driving rollers is less than that between a rotation shaft of the first or third support roller and the driving shaft of the one or more driving rollers.

19. The medium transferring apparatus of claim 1, wherein the one or more support rollers are rotated by a friction force against the belt without applying a power.

* * * * *